United States Patent [19]
Mattson

[11] 3,950,658
[45] Apr. 13, 1976

[54] DATA SEPARATOR WITH COMPENSATION CIRCUIT

[75] Inventor: Gary LeVerne Mattson, Pine Island, Minn.

[73] Assignee: International Business Machines Corporation, Armonk, N.Y.

[22] Filed: Oct. 15, 1974

[21] Appl. No.: 514,982

[52] U.S. Cl. .................. 307/269; 307/208; 328/63; 328/155
[51] Int. Cl.² ...................... H03K 1/17; H03K 5/13
[58] Field of Search ...... 307/208, 229, 269; 328/63, 328/155; 329/104

[56] References Cited
UNITED STATES PATENTS

| | | | |
|---|---|---|---|
| 3,080,487 | 3/1963 | Mellott et al. | 328/63 |
| 3,238,462 | 3/1966 | Ballard et al. | 328/63 |
| 3,333,205 | 7/1967 | Featherston | 328/63 |
| 3,506,923 | 4/1970 | Ambrico et al. | 329/104 |
| 3,510,786 | 5/1970 | Paulson | 328/63 |
| 3,731,208 | 5/1973 | Laatt et al. | 307/269 |

OTHER PUBLICATIONS

"Phase Detector for Self-Clocking Variable-Frequency Oscillators" by Johnson, IBM Tech. Discl. Bull., Vol. 14, No. 7, Dec. 1971, p. 2171.

"Clock-Phase Correction for Digital Data Recording" by Ho et al., IBM Tech. Discl. Bull., Vol. 17, No. 1, June 1974, pp. 206–207.

*Primary Examiner*—Stanley D. Miller, Jr.
*Attorney, Agent, or Firm*—Keith T. Bleuer

[57] ABSTRACT

A compensation circuit for providing output clock pulses which are accurately spaced timewise with respect to data times at which raw data pulses normally exist on a raw data line assuming no time shifting due to transmission difficulties and including a voltage controlled oscillator and a charge pump circuit for providing a changing voltage applied to the oscillator, and means for providing down and up change frequency signals applied to the charge pump circuit, the up change frequency signal being initiated at the leading edge of a raw data pulse on the raw data line when the raw data pulse is in normal position or is early or late and the down change frequency signal being initiated when the up change frequency signal terminates and terminating midway between data times.

7 Claims, 3 Drawing Figures

DATA SEPARATOR WITH COMPENSATION CIRCUIT

BACKGROUND OF THE INVENTION

The invention relates to circuitry for providing clock pulses from raw input data which does not include regular clock pulses and which may be, for example, a signal of modified frequency modulation (MFM). Such modulation includes only clock pulses between two consecutive zeros of the raw data signal and the data pulses of the raw data signal may be shifted with respect to their proper and normal times of occurrence due to transmission difficulties.

It has previously been proposed to provide clock pulses for a modified frequency modulation raw data signal utilizing an oscillator which is controlled by an increase frequency signal and a decrease frequency signal causing the oscillator to respectively increase and decrease in frequency of oscillation. The increase frequency signal and the decrease frequency signal rise alternately so that the frequency of oscillation of the oscillator is first increased and then decreased, and the length of one of these signals is varied in accordance with a measure of the phase error between the output of the oscillator and the data pulses of the raw data signal. The length of time between consecutive rises of one of these signals is the normal length of time (without time shifting) between two consecutive data pulses of the raw data signal, so that if the pulses of these two signals are equal in length each of these pulses occupy one-half of the time between two consecutive data pulses (without time shifting) of the raw data signal. In the event that a pulse of one of these increase and decrease frequency signals is longer than a corresponding pulse of the other of these two signals, there is an overlap of the pulses of these two signals. Since the pulses of the increase and decrease signals are nominally up for one-half of the time between two consecutive data pulses in the raw data signal, the change in frequency of the oscillator during correction (even when there should have been no correction) is unduly great. Also, with this arrangement, if there is the overlap just mentioned (which would be produced by the case in which a data pulse is early), an error is introduced in the oscillating frequency of the oscillator since both the increase and decrease frequency signals are in control at the same time. Two current sources must be used for controlling the oscillator due to this overlap that occurs with an early data pulse, and the current sources must therefore be accurately matched. Circuitry of this type is described in general in the Technical Disclosure Bulletin of IBM Corporation, December, 1971, page 2171.

SUMMARY OF THE INVENTION

It is an object of the present invention to provide improved circuitry of this general type which also provides increase frequency and decrease frequency signals applied to an oscillator for the purpose of providing clock pulses synchronized with the data pulses of an MFM raw data signal, with the circuitry being such that a first one of these signals always falls at a time which is midway between the data times at which the data pulses of a raw data input signal normally occur, with no change in time spacing between data pulses due to transmission difficulties. The circuitry, in addition, shall be such that the second of these two signals always falls when the first of these signals rises and with the second of the signals rising at the incidence or leading edge of a raw data pulse at the time it actually occurs. Thus, the second of these signals will rise at the data time at which the leading edge of an accurately timed raw data pulse occurs or rises early if the raw data pulse is early.

DESCRIPTION OF THE PREFERRED EMBODIMENT

Figure 1:
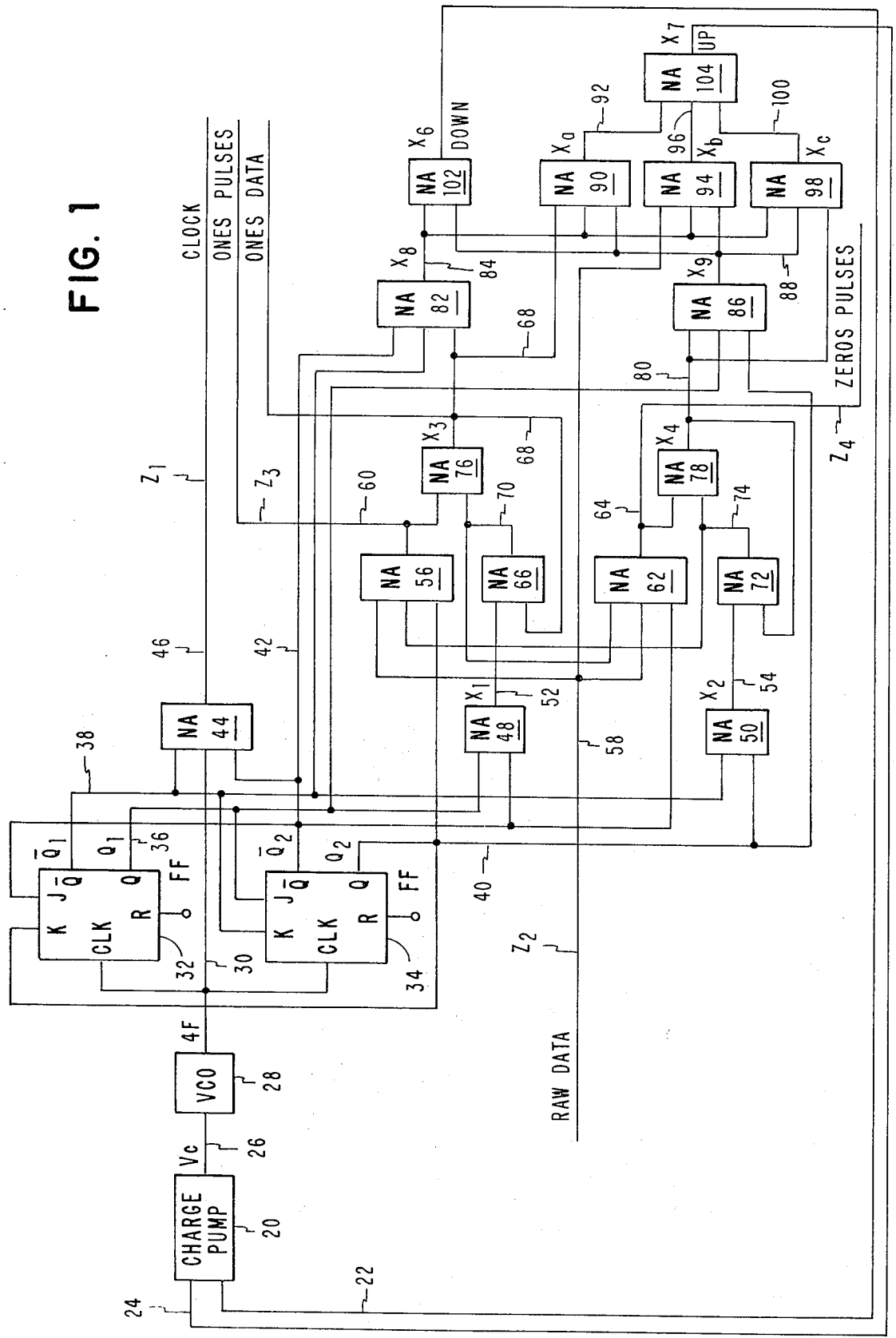
FIG. 1 shows a compensation circuit for providing decrease and increase frequency signals to a charge pump which in turn controls a voltage controlled oscillator, with the circuit being subject to a raw data signal so as to provide an output clock signal which is synchronized with the data pulses of the raw data signal.

Referring to FIG. 1, the compensation circuit of the invention includes a charge pump 20 having two input lines 22 and 24 connected to it and having an output line 26. A voltage controlled oscillator 28 has the line 26 applied to it as an input and has a line 30 as an output carrying a clock signal.

A pair of flip flops 32 and 34 have the line 30 applied to them as inputs. The flip flop 32 has two output terminals Q and $\overline{Q}$, and these terminals are connected to output lines 36 and 38, respectively carrying the signals $Q_1$ and $\overline{Q}_1$. The flip flop 34 has the two output terminals Q and $\overline{Q}$, and these are connected to output lines 40 and 42. The lines 40 and 42 carry the signals $Q_2$ and $\overline{Q}_2$. Each of the flip flops 32 and 34 has K and J control terminals and a "reset" R terminal. The outputs of the flip flops 32 and 34 are interconnected, with the output lines 36 and 38 of the flip flop 32 being respectively connected to the J and K control terminals of the flip flop 34 and with the output lines 40 and 42 of the flip flop 34 being connected respectively with the K and J control terminals of the flip flop 32.

The flip flops 32 and 34 are of the same type. Each of the flip flops 32 and 34 is controlled by a clock signal on the line 30 and changes state, if at all, at the falling edge of a clock pulse. If the signals on the two control terminals K and J are both low, the flip flop does not change state. If the signals on the two control inputs K and J are both high, the flip flop switches state, with the Q terminal going low if high and the $\overline{Q}$ terminal going high if low. If the signals on the K terminal is high and that on the J terminal is low, the signal on the Q terminal goes low. If the signal on the K terminal is low and that on the J terminal is high, the signal on the Q terminal goes high.

The lines 38, 30 and 42 constitute the three inputs to a NAND circuit 44, and the output line 46 of this circuit carries a clock signal $Z_1$.

A NAND circuit 48 has the leads 36 and 42 as inputs, and a NAND circuit 50 has the leads 38 and 40 as inputs. The circuits 48 and 50 respectively have the output lines 52 and 54 carrying the signals $X_1$ and $X_2$. The line 40 also constitutes one of three inputs to a NAND circuit 56, and a line 58 carrying a raw data, $Z_2$ signal also constitutes one of the inputs of the NAND circuit 56. The output line 60 of the NAND circuit 56 carries a signal $Z_3$ designated as "ones pulses." A NAND circuit 62, generally corresponding to the NAND circuit 56, has the raw data line 58 and the line 42 as two of its three inputs, and the output line 64 of the NAND circuit 62 carries a $Z_4$ signal, "zeros pulses."

A NAND circuit 66 has the line 52 and a line 68 as its two inputs. The line 68 has an $X_3$, "ones data" signal thereon. The NAND circuit 66 has the line 70 as its output, and this line constitutes one of the three inputs of the NAND circuit 62. A NAND circuit 72, corresponding generally to the NAND circuit 66, has the line 54 as one of its two inputs and has a line 74 as its output. The line 74 is one of the three inputs of the NAND circuit 56.

A NAND circuit 76 has the lines 70 and 60 as its two inputs and has the line 68, carrying an $X_3$ signal, as its output. A NAND circuit 78, corresponding generally to the NAND circuit 76, has the lines 64 and 74 as its two inputs and has the line 80, carrying an $X_4$ signal, as its output. The line 80 constitutes one of the two inputs of the NAND circuit 72.

A NAND circuit 82 has the lines 38, 42 and 68 as its three inputs and has the line 84, carrying an $X_8$ signal as its output. A corresponding NAND circuit 86 has the lines 80, 36 and 40 as its three inputs and has a line 88, having an $X_9$ signal thereon, as its output.

A NAND circuit 90 has the lines 68, 84 and 88 as inputs and has a line 92, carrying an $X_a$ signal, as an output. A NAND circuit 94 has the lines 58, 84 and 88 as inputs and has the line 96 carrying the $X_b$ signal as an output. A NAND circuit 98 having the lines 84, 88 and 80 as inputs has the line 100 carrying the signal $X_c$ as an output.

A NAND circuit 102 has the lines 88 and 84 as its two inputs and has its output connected to the line 22 which carries the $X_6$ "down" signal. A NAND circuit 104 has the lines 92, 96 and 100 as inputs and has its output connected to the line 24 carrying the $X_7$ "up" signal.

Figure 2:
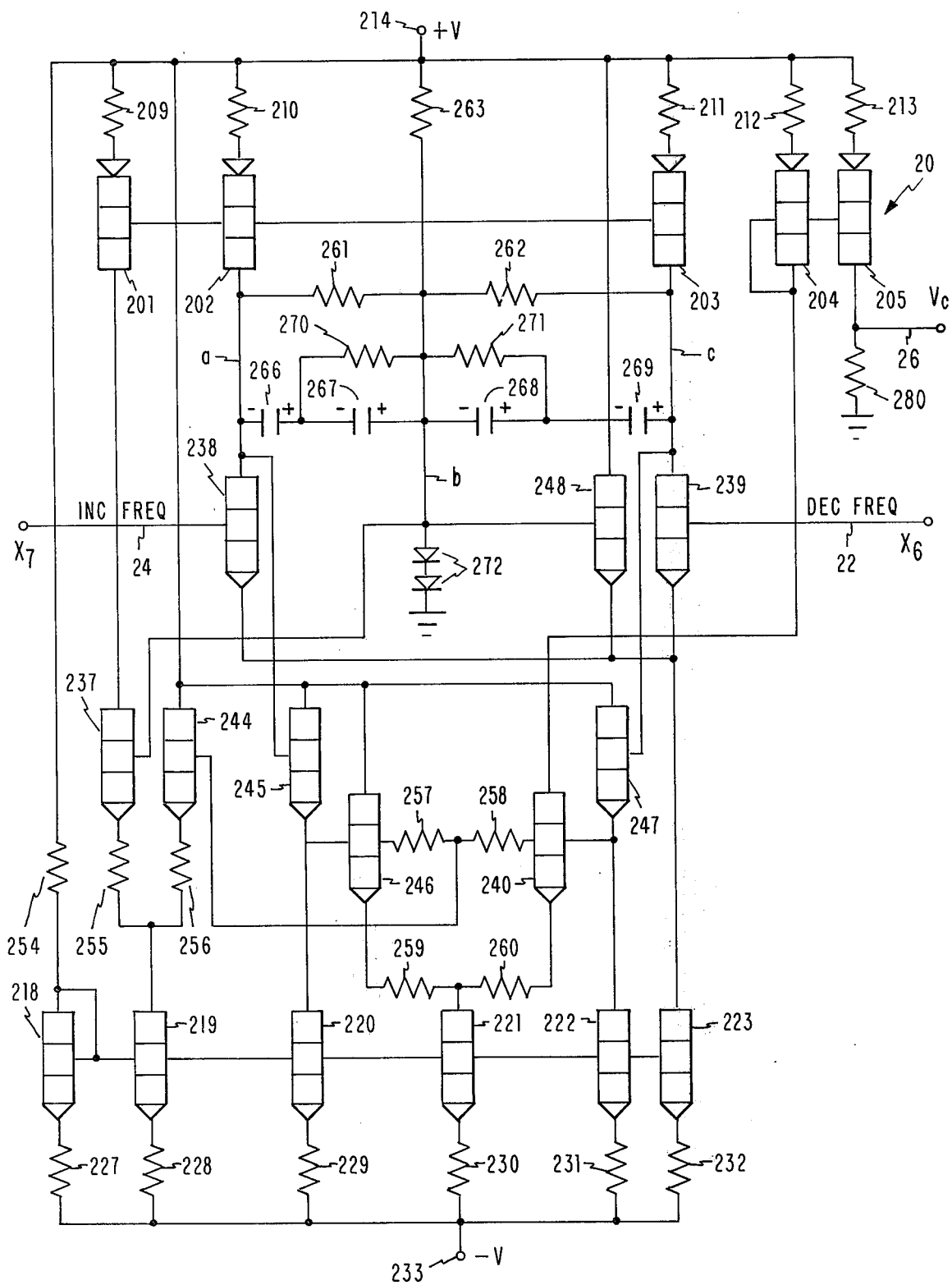
FIG. 2 is a detailed showing of the charge pump which is shown generally in FIG. 1.

Referring to FIG. 2, the charge pump circuit 20 may be seen to include transistors 201–205 respectively having resistors 209–213 connected in series with them and being thereby connected with a plus voltage source 214. The FIG. 2 circuit also includes transistors 218–223 respectively connected with resistors 227–232 and thereby with a minus voltage source 233. The transistors 201–204 are respectively connected in series with transistors 237–240. Transistors 244–248 are connected with the plus voltage source 214, as shown. Resistor 254 is connected between the plus voltage source 214 and the transistor 218; resistors 255 and 256 connect the transistors 237 and 244 with the transistor 219, and resistors 257–260 interconnect the transistors 246 and 240, as shown. Resistors 261–263 connect the transistors 202 and 203 with the plus voltage source 214, as shown. Condensers 266–269 are connected in series between the transistors 202 and 203, as shown; and resistors 270 and 271 are connected across the condensers 267 and 268, as shown. A pair of diodes 272 are connected between ground and the bases of transistors 237 and 248, as shown. The increase frequency or "up" line 24 is connected to the base of transistor 238, and the decrease frequency or "down" line 22 is connected to the base of transistor 239. A resistor 280 is connected to the collector of the transistor 205, and the output signal voltage $V_c$ of the charge pump circuit 20 on line 26 appears across the resistor 280.

The charge pump circuit 20 shown in FIG. 2 functions basically to change the voltage applied to the voltage controlled oscillator 28 to provide resulting clock pulses (signal $Z_1$ on line 46) that run in synchronism with the raw data signal $Z_2$ on line 58. This is done by charging integrating capacitors 266 and 267 when there is an increase in frequency signal $X_7$ on line 24 and discharging capacitors 268 and 269 when there is a decrease frequency $X_6$ signal on line 22 so that the charge pump circuit 20 produces an output voltage $V_c$ on line 26 that is proportional to the frequency of the raw data signal $Z_2$. The condensers 266 and 267 are charged when the $X_7$ signal is up, and the condensers 268 and 269 are discharged when the $X_6$ signal is up. The charge pump circuit is responsive to the voltage across all four of the condensers 266–269 after charging the pair of condensers 266 and 267 and discharging the other pair of condensers 268 and 269, to indicate whether there should be an overall change of the voltage $V_c$ and of the frequency of the voltage controlled oscillator 28. The charging action on condensers 266 and 267 is followed in each case by a discharging action on the condensers 268 and 269, and the voltages on the condensers 266–269 are maintained in active regions by other portions of the FIG. 2 circuit, as will be described. The transistor 238 comes on for every data bit on the raw data line 58, and in this case there is a current through capacitors 266 and 267 from right to left as seen in FIG. 2; and the transistor 223 together with the associated resistor 232 constitutes a current source for charging these capacitors. When there is a decrease frequency pulse on line 22, which also occurs once for each data bit on raw data line 58, transistor 239 is turned on and there is a current from left to right as seen in FIG. 2 through capacitors 268 and 269 from transistor 223 as a current source. These charging and discharging actions of the capacitors 266–269 occur alternately, and obviously the voltages would build up on condensers 266–269 indefinitely, were it not for the circuitry in FIG. 2 regulating the regions in which the condensers 266–269 may operate.

The transistor 223, in particular, constitutes a single current source for charging the condensers 266 and 267 and for discharging the condensers 268 and 269 in the manner just above mentioned. It will be observed that the transistor 223 is connected in series with the transistors 238 and 239 which respectively control the charging of the condensers 266 and 267 and the discharging of condensers 268 and 269 as above mentioned.

Still more particularly, when an increase frequency pulse occurs (signal $X_7$) on line 24, transistor 238 is turned on, drawing current from the plus voltage source 214 through resistor 263 and through capacitor 267 in parallel with resistor 270 and also through capacitor 266. This causes the voltage at the collector of transistor 238 to fall and causes the reduction of the voltage on the base of transistor 245 and the reduction of the voltage on the base of transistor 246. The effect is to tend to increase the difference in voltage on the bases of transistors 246 and 240. The voltage on the base of transistor 240 has risen with respect to that on the base of transistor 246, and current in the collector of transistor 240 increases, increasing the current in the collector and in the emitter of transistor 204. Due to the common base connection between transistors 204 and 205, the current flow through transistor 205 and thus through resistor 280 increases, thereby increasing the voltage $V_c$ supplied to the voltage controlled oscillator 28. This increases the frequency output of the VCO 28.

A decrease frequency pulse (signal $X_6$) on line 22 has a similar effect, operating on capacitor 268 in parallel with resistor 271 and on capacitor 269, tending to reduce the voltage on the base of transistor 247 and thereby reducing the voltage on the base of transistor 240. This has the effect of providing a net increase of voltage between the bases of transistor 246 and 240. Therefore, the current in transistor 240 goes down; the collector current and emitter current in transistor 204 falls; and, by way of the common base connection between transistors 204 and 205, the output voltage $V_c$ on line 26 falls, decreasing the frequency of the voltage controlled oscillator 28.

Most of the parts now about to be referred to cooperate with the transistors 202 and 203 in causing the capacitors 266–269 to operate at proper voltage levels.

Transistors 238 and 239 cause current to flow from the line $b$ to the lines $a$ and $c$. The purpose of transistors 202 and 203 is to replace that current drawn by transistors 238 and 239 on the average, putting current continually back into the condensers 266–269, with current flowing from the outer lines $a$ and $c$ toward the line $b$, to reduce the charges on the condensers 266–269 and thus maintain the condensers 266–269 in a proper region of operation insofar as voltage is concerned. The diodes 272 are simply for the purpose of providing a voltage reference for transistors 237 and 248. Resistors 261 and 262 are provided for causing the charge pump circuit 20 to have the desired gain characteristics. Resistors 257 and 258 provide a voltage averaging network to average the voltage at the bases of transistors 246 and 240 and apply this voltage to the base of transistor 244. Resistors 259 and 260 are bias resistors for gain stabilization. Transistors 218–222 and the associated resistors 227–231 form current sources at the collectors of these transistors such that all currents are matched and track each other. Resistors 255 and 256 are gain stabilization resistors and together with transistors 237 and 244 form a network to keep the average voltage of the bases of transistors 246 and 240 at approximately two diode drops above ground. The operation is such that if the voltage at the collectors of transistors 238 and 239 increases, this voltage is applied to the bases of transistors 245 and 247 and through their base emitter junction to the bases of transistors 246 and 240 thereby increasing the average voltage that is applied through the two resistors 257 and 258 to the base of transistor 244. As that voltage increases, more current is drawn through the collector and emitter of transistor 244 and less current is drawn through the emitter and collector of transistor 237. This reduces the collector current and emitter current in transistor 201, thereby reducing the voltage on the bases of transistors 201, 202 and 203 which reduces the current out of the collectors of transistors 202 and 203. This tends to decrease the net voltage on the collectors of transistors 238 and 239.

Figure 3:
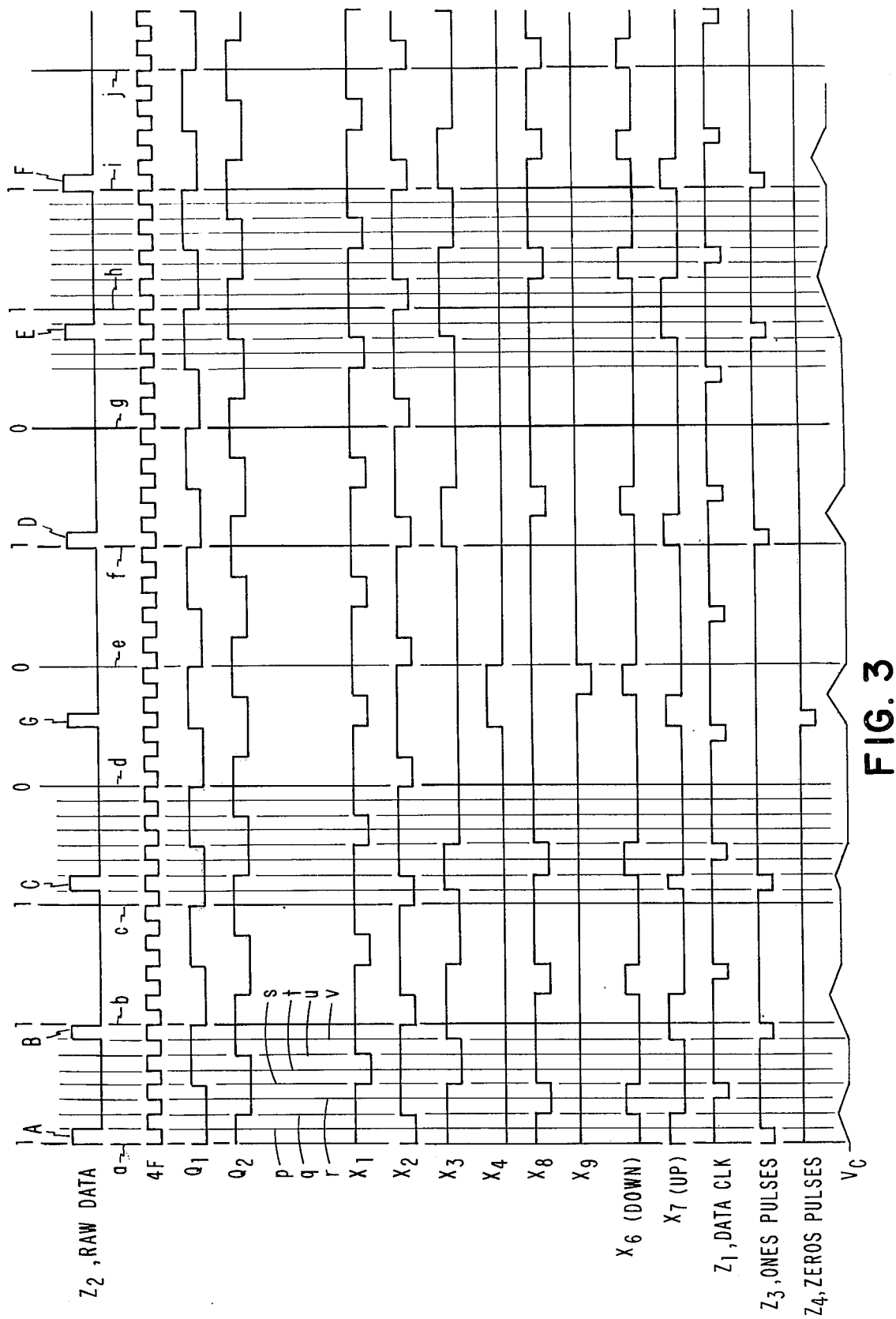
FIG. 3 is a diagram showing the wave forms of the various signals that exist in the FIG. 1 circuit.

The raw data signal $Z_2$ on line 58 (see FIG. 3) is so-called "MFM" or "modified frequency modulation" which does not include any clock pulses except clock pulses located between two consecutive zeros of the raw data signal. The data pulses as shown in FIG. 3 are pulses A, B, C, D, E and F, and the clock pulse is the clock pulse G between the two consecutive zeros. The leading edge of each of the data pulses theoretically should occur precisely at the data times $a$, $b$, $c$, $f$, $h$ and $i$. The data times $a-j$ in FIG. 3 are equally spaced apart, and it will be observed that data pulses A, D and F actually do have their leading edges occurring at the proper times $a$, $f$ and $i$. The clock pulse G, it will be noted, occurs midway between the data times $d$ and $e$ which correspond to zeros. Due to transmission difficulties, it is frequently not possible to cause the data pulses to occur precisely at the data times $a$, $b$, $c$, $f$, etc., at which they should occur. For example, the data pulses B and E in FIG. 3 are early, while the data pulse C is late.

Due to the fact that the data pulses may be either early or late, a major problem that occurs in receiving such MFM signals is in getting a clock, such as the voltage controlled oscillator 28, to run in synchronism with the data. The compensation circuit of FIG. 1 is so arranged as to detect the phase difference between the voltage controlled oscillator 28 and the MFM data and using this information to adjust the frequency of the voltage controlled oscillator 28. The data pulses of the raw data signal $Z_2$ may be up to one-fourth of a time frame early or late, a time frame being defined as the time between consecutive ones of the data times $a$, $b$, $c$, $d$, $e$, $f$, $g$, $h$, $i$ and $j$.

The FIG. 1 compensation circuit attempts to align the leading edge of the raw data pulses (such as pulses A, B, C, etc. in FIG. 3) to transitions of signal $Q_1$ on line 36, which are timed from the output of the voltage controlled oscillator 28 by flip flops 32 and 34. When a raw data pulse, such as one of the pulses A, B, C, etc. occurs, the increase frequency signal $X_7$ on line 24 rises at the leading edge of the raw data pulse; and the signal falls with the subsequent fall of the 4F signal occurring after the data time ($a$, $b$, $c$, etc.) for this raw data pulse. This is at a subtime of, one-fourth of the first time from between data times $a$ and $b$, for example. The decrease frequency signal $X_6$ rises at the same time as the increase frequency signal $X_7$ falls, and the decrease frequency signal $X_6$ falls with the subsequent fall of the 4F signal on line 30 midway between data times, at the time $s$, for example. It will be noted that the $X_6$ pulses are all of the same length, one-fourth of a time frame. The net difference between the lengths of time the increase frequency signal $X_7$ and the decrease frequency signal $X_6$ are up is a measure of the length of time the raw data pulse is early or late with respect to its data time ($a$, $b$, $c$, $d$, $e$, $f$, etc.). As previously explained, the increase frequency signal $X_7$ connects a current source (transistor 223 connected to capacitor 266 via transistor 238) to charge a capacitor (condensers 266 and 267), and the decrease frequency signal $X_6$ connects this current source to discharge capacitors 268 and 269. The voltage across the capacitors 266–269 is used to control the frequency of the clock (voltage controlled oscillator 28) which generates the 4F signal on line 30. The FIG. 1 compensation circuit produces these results in the following manner:

The 4F signal on line 30 is applied to the flip flops 32 and 34, and the outputs of these flip flops on lines 36, 38, 40 and 42 are so connected with the inputs of these flip flops that these flip flops provide the $Q_1$, $Q_2$ signals of frequency F. The $Q_1$ and $Q_2$ signal are 90° out of phase as will be observed from FIG. 3. The $Q_1$ signal rises midway between data times $a$ and $b$ as at time $s$, while the $Q_2$ signal rises midway between the rise of the $Q_1$ signal and the subsequent data time, such as at time $r$. The $Q_1$, $Q_2$ signals are used for timing purposes as will be described.

The $X_1$ and $X_2$ are also timing signals derived from the outputs of the flip flops 32 and 34. The $X_1$ signal rises three-fourths of a time frame following a data time as at time $r$ and falls midway between the following two data times, and the $X_2$ signal rises within one-fourth of a time frame as at time $q$ and falls at the following data time.

The signal $X_3$ constitutes an early input to the decrease frequency signal $X_6$ on line 22 and is influenced by the raw data signal $Z_2$. The signal $X_3$ rises when a raw data pulse occurs (at the leading edge of a raw data pulse), and this signal falls on the following rise of the signal $Q_1$. The signal $X_4$ is the opposite and is related to two consecutive zeros in the raw data signal $Z_2$. The signal $X_4$ rises with the rise of a transition bit or clock pulse between consecutive zeros in the raw data signal $Z_2$ (pulse G in raw data signal $Z_2$, for example) and falls on the subsequent fall of the signal $Q_1$ and the subsequent data time (e, for example).

The signal $X_8$ rises when the signal $Q_1$ rises. The signal $X_8$ falls when the signal $Q_2$ falls if and only if the signal $X_3$ is up. The signal $X_9$ is similar to the signal $X_8$ but is based on the transition pulse (pulse G, for example) between zeros in the raw data signal $Z_2$ and rises when the signal $Q_1$ falls. The signal $X_9$ falls when the signal $Q_2$ rises if and only if the signal $X_4$ is up.

The signal $X_6$, which is the signal on line 22 to decrease frequency of the voltage controlled oscillator 28, is a logical combination of signals $X_8$ and $X_9$; and signal $X_6$ is up when either the signal $X_8$ or $X_9$ is down. It will be observed that the signal $X_6$ rises for each of the raw data pulses (pulses A, B, etc.) at the second sub-data time such as time $q$ following a data time ($a$, etc.) and remains raised for one quarter of the time frame between data times. For a transition or a clock pulse (such as the pulse G), the signal $X_6$ is up for the last quarter of the data frame in which the transition or clock pulse exists. The signal $X_6$ is not up for zeros in the raw data signal $Z_2$. The signal $X_7$ rises when either the signal $X_3$ or the signal $X_4$ rises and falls when the signal $X_6$ rises. The signal $X_7$ is up for a longer time if the raw data pulse (for example data pulse B) is early while the signal $X_7$ is up for a shorter time if the raw data pulse (data pulse C, for example) is late.

The data clock pulses (signal $Z_1$) are exactly in synchronism with the data times ($a$, $b$, etc.) and rise exactly midway between successive data times, such as at time $s$, assuming that the voltage controlled oscillator 28 is in synchronism with the raw data signal $Z_2$, which the FIG. 1 circuit functions to provide. The clock pulse signal $Z_1$ is essentially the output of the two flip flops 32 and 34 utilizing the NAND circuit 44, as is apparent.

The ones pulses in signal $Z_3$ are simply negative pulses that correspond exactly timewise with the raw data pulses (A, B, etc.). The zero pulses are also negative pulses in signal $Z_4$ that correspond exactly timewise with the transition or clock bits between zeros in the raw data signal $Z_2$ (the transition or clock bit G, for example).

It will be apparent from FIG. 3 that there is no overlapping of the $X_6$ decrease frequency signal and the $X_7$ increase frequency signal. Therefore, it is possible to use a single current source (transistor 223) for charging the condensers 266 and 267, which tend to increase the $V_c$ signal and for subsequently discharging the condensers 268 and 269 which tend to decrease the $V_c$ signal. For a data pulse that is exactly on time, for example, the data pulse A, the $X_6$ and $X_7$ signals are up for only a quarter of a time frame (the total elapsed time is thus only one-half of a data frame and the frequency shift of the voltage controlled oscillator 28 during this time is thus held to zero. It will be observed that for all cases, the $X_6$ decrease frequency signal is up for one-fourth of a time frame. The $X_7$ increase frequency signal is up for varying times, depending on whether the data pulse is early or late with respect to its data time. In the event that the data pulse of the raw data signal $Z_2$ is early, the $X_7$ increase frequency signal rises at the same time as the leading edge of the data pulse occurs, and the $X_7$ signal thus is up for a longer time than one-fourth of a time frame. The raw data pulse E, for example, is early, and the resulting $X_7$ pulse is up, beginning one-fourth of a time frame prior to the corresponding data time $h$. The data pulse C is late, and the $X_7$ signal is therefore up for a shortened time of just one-eighth of a time frame. The difference between the lengths of the $X_7$ pulses and the constant length $X_6$ pulses results in the voltage controlled oscillator being adjusted in frequency so that the clock pulses of the $Z_1$ signal consistently rise midway between the data times $a-j$. The ones pulses of the signal $Z_3$ are produced automatically by the FIG. 1 circuitry to correspond timewise with respect to the data pulses A, B, C, D, E and F as has been described. Likewise, the FIG. 4 circuit produces the zeros pulses to correspond timewise with respect to transition bits, for example the transition bit G.

I claim:

1. Circuitry for producing a data clock pulse for each data time at which a data pulse may normally exist on a raw data input line with the data pulses being shiftable timewise from their normal data times to be abnormal timewise, said circuitry comprising a variable frequency controlled oscillator for producing clock pulses, first means responsive to clock pulses from said variable frequency controlled oscillator for producing bit shift limit signals, second means responsive to clock pulses from said variable frequency controlled oscillator for producing data time signals, means responsive to said clock pulses, said limit signals and said data time signals for producing said data clock pulses, means for producing a first change frequency signal effective on said variable frequency oscillator to change the frequency in one direction and initiated under the control of a raw data pulse on said raw data line and terminated at said bit shift limit, means for initiating a second change frequency signal effective on said oscillator for changing the frequency of the oscillator in the opposite direction and initiated under control of termination of said first change frequency signal and terminated with the termination of a clock pulse from said variable frequency oscillator, and means for applying said first and second change frequency signals to said variable frequency oscillator whereby the frequency thereof is first increased and then decreased to provide a net change in frequency based upon the difference between time durations of said first and second change frequency signals.

2. The circuitry as set forth in claim 1 wherein said means for applying said first and second change frequency signals to said variable frequency oscillator includes a charge pump for changing the voltage applied to the oscillator under the control of said first and second change frequency signals.

3. The circuitry as set forth in claim 2, said charge pump including a first capacitor which is charged under the control of said first change frequency signals and another capacitor which is discharged under the control of said second change frequency signal, and a single source of electromotive force applicable to both of said capacitors for charging said first capacitor and for discharging said another capacitor.

4. Correction circuitry for generating increase and decrease frequency correction signals for a clock in data separator functioning to distinguish one bits occurring within a bit cell from clock bits occurring at the edge of a bit cell, the improvement comprising:

means for providing repetitively occurring pulses defining data times, means for generating limit signals defining bit shift and clock shift limits, means responsive to pulses representing one bits and clock bits for generating increase frequency correction signals having durations dependent upon their occurrence relative to said data times and clock times and terminating and at said bit shift and clock shift limits, means for generating fixed duration decrease frequency correction signals in response to termination of said increase frequency correction signals, and means for applying said increase and decrease frequency correction signals to said clock circuit whereby the frequency thereof is first increased and then decreased to provide a net change in frequency based upon the difference between time durations of said increase and decrease frequency correction signals.

5. The correction circuitry of claim 4 wherein said increase frequency correction signals have a longer duration when said one bits occur prior to than when occurring after said data times.

6. The correction circuitry of claim 4 wherein said data times are defined by the fall of said repetitively occurring pulses.

7. The correction circuitry of claim 4 wherein said data times occur at the center of said bit cells.

* * * * *